(12) United States Patent
Nishikawa et al.

(10) Patent No.: US 8,024,755 B2
(45) Date of Patent: Sep. 20, 2011

(54) INTERACTIVE PROGRAM GUIDE WITH PREFERRED ITEMS LIST APPARATUS AND METHOD

(75) Inventors: Yuko Nishikawa, La Jolla, CA (US); Dayan Golden, San Diego, CA (US); Michael A. Bergeron, Poway, CA (US); Himgan Wibisono, San Francisco, CA (US); Philip McKay, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1042 days.

(21) Appl. No.: 10/806,830

(22) Filed: Mar. 23, 2004

(65) Prior Publication Data
US 2005/0108756 A1 May 19, 2005

Related U.S. Application Data

(60) Provisional application No. 60/520,752, filed on Nov. 17, 2003.

(51) Int. Cl.
*G06F 3/00* (2006.01)
*G06F 13/00* (2006.01)
*H04N 5/445* (2011.01)

(52) U.S. Cl. ........... 725/46; 725/39; 725/44; 725/47; 725/52; 725/59; 348/461; 715/802; 715/812

(58) Field of Classification Search .............. 725/47, 725/39, 46, 45, 52, 53, 60, 13, 14, 59, 44
See application file for complete search history.

(56) References Cited

U.S. PATENT DOCUMENTS

| | | | |
|---|---|---|---|
| 4,272,780 A | 6/1981 | Belmares-Sarabia et al. | |
| 5,583,560 A | 12/1996 | Florin et al. | |
| 5,767,854 A | 6/1998 | Anwar | |
| 5,844,620 A | 12/1998 | Coleman et al. | |
| 5,880,768 A | 3/1999 | Lemmons et al. | |
| 6,005,601 A | 12/1999 | Ohkura et al. | |
| 6,263,507 B1 | 7/2001 | Ahmad et al. | |
| 6,411,337 B2 | 6/2002 | Cove et al. | |
| 6,505,194 B1 | 1/2003 | Nikolovska et al. | |
| 6,637,029 B1 | 10/2003 | Maissel et al. | |
| 6,727,914 B1 * | 4/2004 | Gutta | 715/719 |

(Continued)

FOREIGN PATENT DOCUMENTS
WO 00/04708 1/2000

OTHER PUBLICATIONS

Office Action from U.S. Appl. No. 10/806,713 dated Oct. 23, 2007.

(Continued)

*Primary Examiner* — Joseph P Hirl
*Assistant Examiner* — Joshua Taylor
(74) *Attorney, Agent, or Firm* — Fitch, Even, Tabin & Flannery

(57) ABSTRACT

While reviewing potential programs when using an interactive programming guide, a viewer can select to place information regarding specific programs in a list (in one embodiment, such entries are made on an automated basis). The viewer can then recall that list to make a final selection of a present program to view (or record). In some embodiments, this list can be automatically cleared in response to a predetermined trigger event.

9 Claims, 4 Drawing Sheets

U.S. PATENT DOCUMENTS

| | | | |
|---|---|---|---|
| 6,822,661 | B2 | 11/2004 | Sai et al. |
| 7,065,709 | B2 | 6/2006 | Ellis |
| 7,149,983 | B1 | 12/2006 | Robertson |
| 7,159,177 | B2 | 1/2007 | Billmaier et al. |
| 7,386,871 | B1 | 6/2008 | Knudson et al. |
| 7,409,457 | B2 | 8/2008 | Karaoguz |
| 2001/0016947 | A1 | 8/2001 | Nishikawa et al. |
| 2002/0057336 | A1 | 5/2002 | Gaul et al. |
| 2002/0161664 | A1 | 10/2002 | Shaya et al. |
| 2003/0005072 | A1* | 1/2003 | Olah et al. ............... 709/213 |
| 2003/0020744 | A1* | 1/2003 | Ellis et al. ............... 345/723 |
| 2003/0028889 | A1 | 2/2003 | McCoskey et al. |
| 2003/0051246 | A1* | 3/2003 | Wilder et al. ............. 725/49 |
| 2003/0106058 | A1 | 6/2003 | Zimmerman et al. |
| 2003/0126600 | A1 | 7/2003 | Heuvelman |
| 2003/0126605 | A1 | 7/2003 | Betz et al. |
| 2003/0167466 | A1 | 9/2003 | Nakamura et al. |
| 2003/0177495 | A1 | 9/2003 | Needham et al. |
| 2003/0233656 | A1 | 12/2003 | Sie et al. |
| 2004/0031058 | A1 | 2/2004 | Reisman |
| 2004/0031061 | A1 | 2/2004 | McCalla et al. |
| 2004/0045025 | A1 | 3/2004 | Ward et al. |
| 2004/0055007 | A1 | 3/2004 | Allport |
| 2004/0078807 | A1 | 4/2004 | Fries et al. |
| 2004/0107439 | A1* | 6/2004 | Hassell et al. ............ 725/44 |
| 2004/0117831 | A1* | 6/2004 | Ellis et al. ............... 725/53 |
| 2004/0123317 | A1 | 6/2004 | Ozawa |
| 2004/0139100 | A1 | 7/2004 | Gottsman |
| 2004/0139107 | A1* | 7/2004 | Bachman et al. ......... 707/104.1 |
| 2004/0158853 | A1 | 8/2004 | Doi et al. |
| 2005/0060667 | A1 | 3/2005 | Robbins |
| 2005/0071864 | A1 | 3/2005 | Denoue et al. |
| 2005/0076307 | A1 | 4/2005 | Robbin |
| 2005/0102696 | A1* | 5/2005 | Westberg ................. 725/46 |
| 2005/0108756 | A1 | 5/2005 | Nishikawa et al. |
| 2005/0278741 | A1* | 12/2005 | Robarts et al. ........... 725/46 |

OTHER PUBLICATIONS

Office Action from U.S. Appl. No. 10/806,767 dated Dec. 13, 2007.
Office Action from U.S. Appl. No. 10/806,712 dated Feb. 25, 2008.
Office Action from U.S. Appl. No. 10/806,646 dated Mar. 12, 2008.
Office Action from U.S. Appl. No. 10/806,832 dated Mar. 20, 2008.
Office Action from U.S. Appl. No. 10/806,876 dated Apr. 1, 2008.
Nishikawa, , "U.S. Appl. No. 10/806,713", *ITSELF*.
U.S.P.T.O., Office Action for U.S. Appl. No. 10/806,767 mailed Jul. 2, 2008.
U.S.P.T.O., Office Action from U.S. Appl. No. 10/806,712 mailed Aug. 20, 2008.
U.S.P.T.O., Non-Final Office Action from U.S. Appl. No. 10/806,832 mailed Sep. 19, 2008.
U.S.P.T.O., Office Action from U.S. Appl. No. 10/806,713 mailed May 29, 2008.
Advisory Action for U.S. Appl. No. 10/806,712 mailed Nov. 13, 2008.
Non Final Office Action from U.S. Appl. No. 10/806,713 mailed Nov. 26, 2008.
Non Final Office Action for U.S. Appl. No. 10/806,712 mailed Dec. 9, 2008.
Advisory Action for U.S. Appl. No. 10/806,713 mailed Oct. 3, 2008.
Advisor Action for U.S. Appl. No. 10/806,767 mailed Oct. 3, 2008.
Final Office Action for U.S. Appl. No. 10/806,876 mailed Oct. 15, 2008.
Non Final Office Action from U.S. Appl. No. 10/806,767 mailed Dec. 1, 2008.
Final Office Action from U.S. Appl. No. 10/806,712 mailed May 22, 2009.
Final Office Action from U.S. Appl. No. 10/806,767 mailed May 19, 2009.
Advisory Action from U.S. Appl. No. 10/806,832 mailed Jun. 8, 2009.
Examiner Interview for U.S. Appl. No. 10/806,767 mailed Feb. 17, 2009.
Non Final Office Action from U.S. Appl. No. 10/806,876 mailed Mar. 17, 2009.
Final Office Action from U.S. Appl. No. 10/806,832 mailed Apr. 1, 2009.
Final Office Action from U.S. Appl. No. 10/806,713 mailed Apr. 24, 2009.
Advisory Action from U.S. Appl. No. 10/806,767 mailed Jul. 29, 2009.
Advisory Action from U.S. Appl. No. 10/806,712 mailed Jul. 30, 2009.
Non-Final Office Action from U.S. Appl. No. 10/806,712 mailed Nov. 9, 2009.
Non-Final Office Action from U.S. Appl. No. 10/806,713 mailed Nov. 18, 2009.
Examiner's Answer to Appeal Brief from U.S. Appl. No. 10/806,832 mailed Jan. 6, 2010.
Examiner Interview Summary from U.S. Appl. No. 10/806,713 mailed Mar. 25, 2010.
Final Office Action from U.S. Appl. No. 10/806,712 mailed Apr. 13, 2010.
Final Office Action from U.S. Appl. No. 10/806,767 mailed Apr. 6, 2010.
Non-Final Office Action from U.S. Appl. No. 10/806,876 mailed Apr. 1, 2010.
Examiner Interview Summary from U.S. Appl. No. 10/806,712 mailed Sep. 29, 2009.
Examiner Interview Summary from U.S. Appl. No. 10/806,767 mailed Sep. 29, 2009.
Non Final Office Action from U.S. Appl. No. 10/806,876 mailed Oct. 5, 2009.
Non-final Office Action from U.S. Appl. No. 10/806,767 mailed Oct. 23, 2009.
Advisory Action from U.S. Appl. No. 10/806,712 mailed Jun. 30, 2010.
Advisory Action from U.S. Appl. No. 10/806,767 mailed Jun. 21, 2010.
Examiner Interview Summary from U.S. Appl. No. 10/806,712 mailed Jun. 15, 2010.
Examiner Interview Summary from U.S. Appl. No. 10/806,767 mailed Jun. 14, 2010.
Non-Final Office Action from U.S. Appl. No. 10/806,713 mailed Jun. 4, 2010.
Examiner's Answer to Appeal Brief U.S. Appl. No. 10/806,713 mailed Apr. 27, 2011.

* cited by examiner

INTERACTIVE PROGRAM GUIDE WITH PREFERRED ITEMS LIST APPARATUS AND METHOD

CROSS-REFERENCE TO RELATED APPLICATIONS

This application is related to, and claims priority from, U.S. Provisional Patent Application Ser. No. 60/520,752, entitled "Ring Interface for TV Programming Guide," and filed on Nov. 17, 2003. This application is also related to the following applications, which are commonly owned, and which are hereby incorporated by this reference in their entirety: U.S. patent application Ser. No. 10/806,713, entitled "3 DIMENSIONAL BROWSING AND SELECTION APPARATUS AND METHOD," and filed on Mar. 23, 2004; U.S. patent application Ser. No. 10/806,876, entitled "CANDIDATE DATA SELECTION AND DISPLAY APPARATUS AND METHOD," and filed on Mar. 23, 2004; U.S. patent application Ser. No. 10/806,832, entitled "FILTER CRITERIA AND RESULTS DISPLAY APPARATUS AND METHOD" and filed on Mar. 23, 2004; U.S. patent application Ser. No. 10/806,712, entitled, "AUTOMATIC CONTENT DISPLAY APPARATUS AND METHOD," and filed on Mar. 23, 2004; U.S. patent application Ser. No. 10/806,646, entitled "DISPLAY FILTER CRITERIA AND RESULTS DISPLAY APPARATUS AND METHOD," and filed on Mar. 23, 2004; and U.S. patent application Ser. No. 10/806,767, entitled "MULTI-SOURCE PROGRAMMING GUIDE APPARATUS AND METHOD," and filed on Mar. 23, 2004.

TECHNICAL FIELD

This invention relates generally to information displays and more particularly to interactive program guides.

BACKGROUND

Information displays of various kinds are essentially ubiquitous in modern society. Many such displays serve, at least in part, to present content options to a viewer. As the number, kind, and constitution of such content options expand, a concurrent challenge arises to facilitate a way to navigate such options in a manner that is helpful and meaningful to the viewer.

Interactive programming guides are an example of such challenges. With cable, fiber, and/or satellite broadband services facilitating the delivery of an increasing number of varied programming options at any given time, it becomes more important to present a viewer with useful and helpful interface mechanisms to permit the viewer to become informed regarding available content options as the sheer magnitude of programming options renders unlikely the possibility that the viewer will be otherwise sufficiently knowledgeable in this regard.

Present suggestions regarding interactive programming guides as used with various audio/visual content services often present a number of candidate programming options on a display. In some cases this display will include a short textual description of the content of one or more of the candidate programming options or other static information (such as a rating, a brief listing of key actors, a year of publication, and the like). At any given moment, such characterizing descriptions are useful and indeed serve the purpose of informing a viewer regarding each programming option.

In many cases, however, there are a large number of available candidate program offerings that may be considered. In such a case, by the time a viewer has traversed and considered the entire list of available programs, that viewer may well forget which offerings were of most interest to that viewer. When this occurs, the viewer may be faced with the frustrating and time-consuming task of traversing the list of candidate programs a second time (or more) in order to attempt to refresh their recollection in this regard.

BRIEF DESCRIPTION OF THE DRAWINGS

The above needs are at least partially met through provision of the interactive program guide with preferred items list apparatus and method described in the following detailed description, particularly when studied in conjunction with the drawings, wherein.

Figure 1:
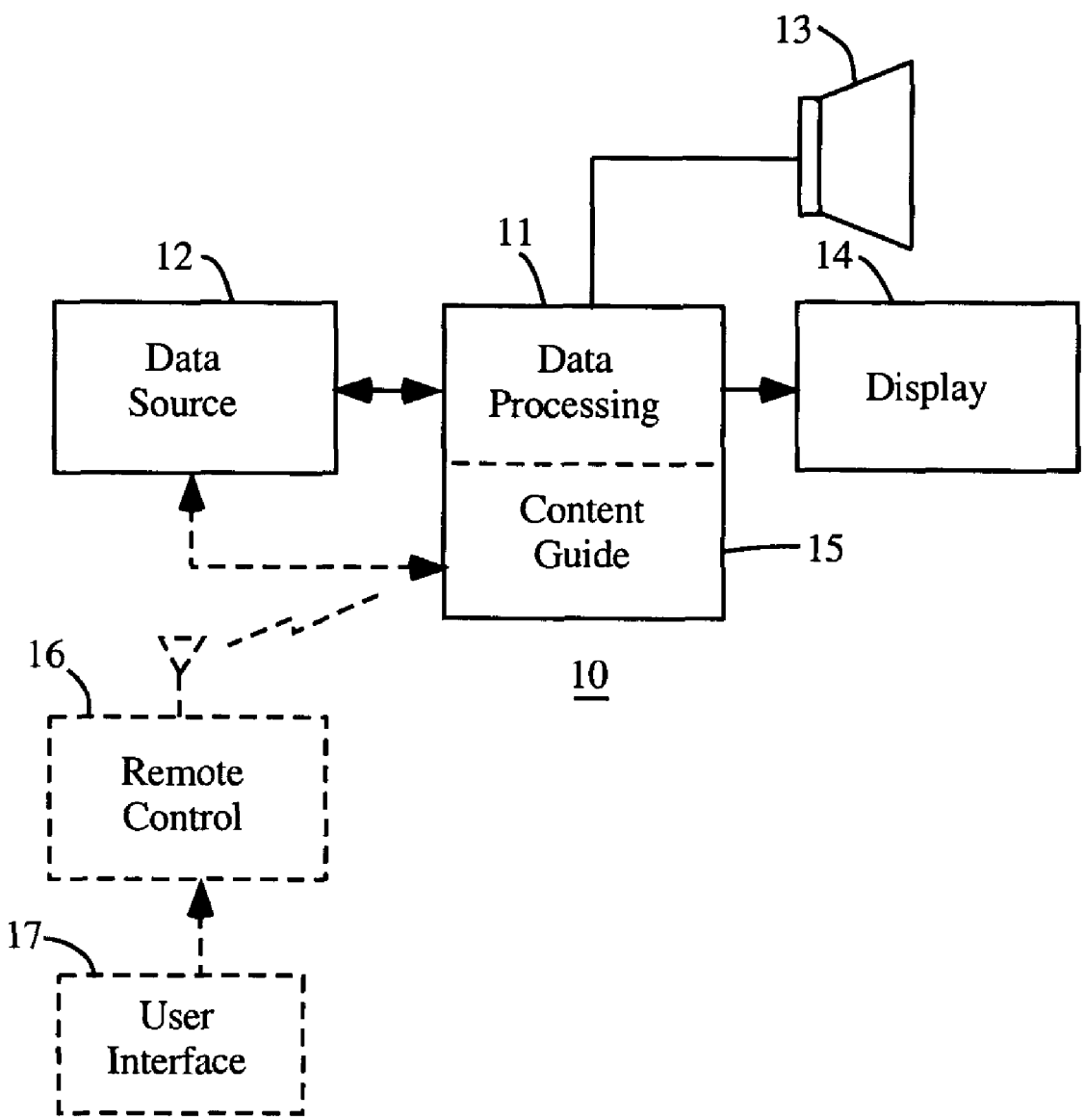
FIG. 1 comprises a block diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

Generally speaking, pursuant to these various embodiments, characterizing descriptors as individually correspond to a plurality of discrete selectable audio/visual programs are provided. In a preferred embodiment the characterizing descriptors comprise any of a variety of descriptors as may be relevant to a variety of audio/visual programs. An interactive programming guide comprised of at least one or more of the characterizing descriptors as correspond to particular ones of the discrete selectable audio/visual programs is displayed. A viewer has various options while reviewing the contents of the guide. The viewer can preliminarily select a particular one of the discrete selectable audio/visual programs using a corresponding area of focus. When a viewer then "selects" a preliminarily selected program, a first predetermined action is taken with respect to that program. When the viewer instead preliminarily selects a different program, a second, different predetermined action is taken with respect to that first program. And when the viewer takes a different action yet, a third, different predetermined action is taken with respect to that first program.

These predetermined actions can vary in accord with the needs or requirements of the system. Pursuant to one approach, a viewer can select a preliminarily selected program for immediate viewing, add that preliminarily selected program to an updateable list of preferred items, or do neither. Another option is to permit the viewer to display the updateable list of preferred items.

Pursuant to one embodiment, a given preliminarily selected program will be automatically added to the updateable list of preferred items whenever the viewer maintains that program in a state of preliminary selection for more than a predetermined amount of time. Pursuant to one embodiment, the contents of the updateable list of preferred items are automatically purged in response to a predetermined trigger (such as expiration of a particular period of time, a selection by the viewer of a particular program to view, and so forth).

So configured, a viewer can navigate amongst and review a large number of programming options. Programs of possible interest can be added to a list (automatically or by the specific instruction of the viewer) during this review process thereby relieving the viewer of otherwise required memorization and the corresponding cognitive loading that such memorization can occasion. Upon concluding this review, or at any time during the review, the updateable list of preferred items can be displayed. The viewer can then peruse this (presumably) shortened list of programming options and make a final selection from amongst the displayed candidates. This list can be automatically cleared in response to any of a wide variety of triggering criteria to aid in ensuring that the list, when displayed, will contain only recently relevant content.

Referring now to the drawings, and in particular to FIG. 1, an apparatus 10 suitable to support and facilitate these teachings can comprise a data processing unit 11 that processes audio/visual information from a data source 12 (or sources) and provides corresponding audio information to an audio processing path 13 and video information to a display 14.

The control circuitry of the data processing unit 11 can be embodied in a variety of ways. For example, the data processing unit 11 can comprise a fixed-purpose dedicated platform or can comprise a partially or fully programmable platform. Such options and architectural alternatives are well understood in the art and need no further elaboration here. In some embodiments, as with a so-called cable or satellite set-top box, the data processing unit 11 can be readily realized through appropriate programming of the processor as typically accompanies such an apparatus.

The data source 12 can comprise any presently known or hereafter developed data source. In a preferred embodiment the data source 12 provides audio/visual content such as television programs and movies. The data source 12 can provide access to wireless broadcast reception services, cable or optical fiber services, and/or satellite services, to name a few (either alone or in conjunction with one another). Depending upon the needs of the application, it is also possible that the data source 12 provides access to discrete selectable items of audio/visual content as are embodied in a plurality of media. For example, the data source 12 may provide access to cable programming options, satellite programming options, and local programming options as may be available via one or more local or otherwise available media drives (such as but not limited to video tape drives or digital video disk (DVD) drives). It is also possible that the data processing unit 11 operably couples to a plurality of such data sources to permit access to corresponding programming services and viewing options.

In a preferred embodiment this apparatus 10 further comprises a content guide 15 such as an interactive program guide. This content guide 15 can comprise an integral part of the data processing unit 11 (as suggested by the illustration in FIG. 1) or can comprise a physically separate platform that operably couples to the data processing unit 11. The content guide 15 can receive information regarding programming options in any of a variety of ways. For example, the data source 12 itself can source such information (either via the data processing unit 11 or directly via a dedicated coupling between itself and the content guide 15 engine). As another example, the content guide 15 can obtain such programming information in other ways such as via a dial-up link (not shown) that facilitates accessing a server that provides such information.

Such content guides are generally well understood in the art. The particular configuration and/or general operation of such engines is not especially important to these embodiments. Therefore additional detailed description will not be provided here regarding content guides except where appropriate below with respect to the description of these embodiments.

It will be understood that such an apparatus 10 is often at least partially responsive to an optional wireless remote control 16. The latter often use infrared technology to facilitate communications but any wireless technology as may be appropriate to the needs of a given application can be utilized. In many instances such a remote control 16 will include a user interface 17 such as, for example, a keypad. Such a keypad will provide one or more keys that, when asserted by a user, will cause transmission of a particular corresponding wireless instruction by the remote control 16. Pursuant to a preferred embodiment, the operations of the content guide 15 will be at least partially configurable and/or otherwise controllable by appropriate remote control signals. Again, such remote controls are well understood in the art and require no further elaboration here.

Figure 2:
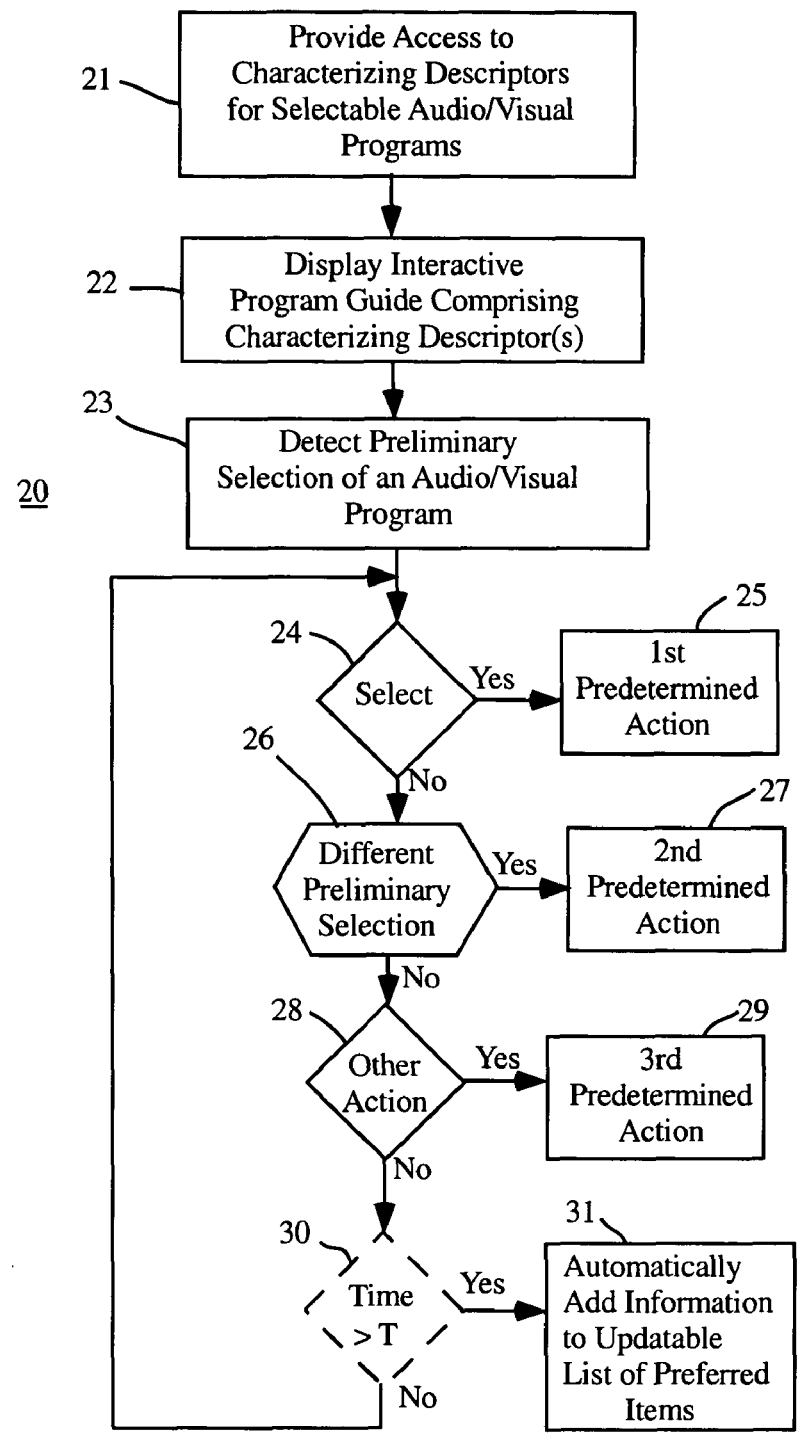
FIG. 2 comprises a flow diagram as configured in accordance with various embodiments of the invention.

Referring now to FIG. 2, a process 20 that is readily supported by such an apparatus 10 (or that can be alternatively effected through any other suitable architectural configuration of choice) will be described. This process 20 provides for access 21 to characterizing descriptors as individually correspond to a plurality of discrete selectable audio/visual programs (such as individual movies or television programs). The characterizing descriptors for such items of audio/visual content can be many and varied and can include, for example, a programming network identifier (such as the network call sign that will broadcast or otherwise source the particular program), a broadcast starting time (or stopping time) for the program, a description (such as a textual description) of (or that otherwise pertains to) the audio/visual content of the audio/visual work, and an indication of the content media source itself (such as whether the program is available by cable, satellite, local media, or the like). The characterizing descriptors can also include samples of the video (and/or audio content) of the item itself and/or a previously prepared trailer or other preview or promotional sample for the item.

The process 20 then provides for the display 22 of an interactive program guide. In a preferred embodiment this interactive program guide will comprise at least one of the characterizing descriptors (such as a program title) as corresponds to a particular one of the discrete selectable audio/visual programs. More typically, it may be desired to provide a plurality of such characterizing descriptors for each displayed program in order to provide more complete information to the viewer.

Figure 3:
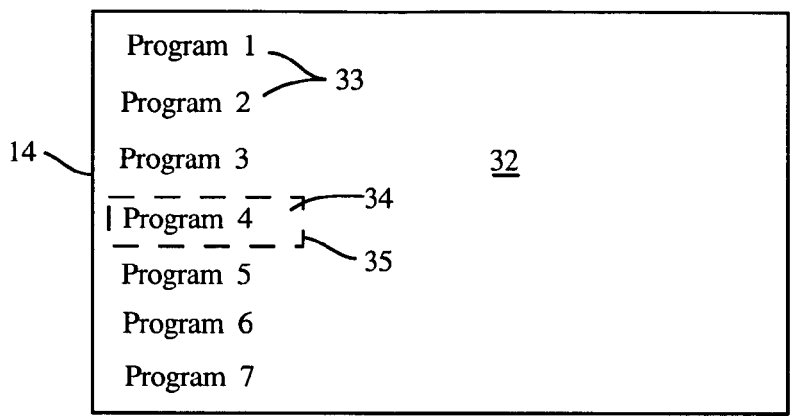
FIG. 3 comprises a display as configured in accordance with various embodiments of the invention.

With momentary reference to FIG. 3, such descriptions for various corresponding available programs 33 can be displayed one-at-a-time on the display 14 or, more preferably, as a group. If desired, a presently selected-for-viewing program can be displayed as a background image 32 behind these descriptors 33.

In one embodiment, a method of selecting specific content or programs from a large set of all available content is provided to limit the collection of candidate programming options. In one or more embodiments a plurality of cascading filters may be provided for facilitating determination of a particular one of the discrete selectable audio/visual programs, the plurality of cascading filters being customizable for each at least one user. In one embodiment, a set of filters that may be either pre-defined or user-defined are applied to the collection of candidate programming options to provide a coordinated join display of the integrated results. According to one embodiment, one or more smart filters are provided for facilitating determination of a particular programming option or content. In one embodiment, smart filters are provided that simultaneously consider content across some or all media available to provide a coordinated join display of the integrated results. In one embodiment the plurality of integrated results may comprise an aggregate pool of candidate viewing choices being reducible on a basis of filter selection criteria from at least one element selected from a group consisting essentially of a plurality of different sources and a plurality of different formats.

In one embodiment, the filters may be customizable by a user. In one embodiment, unique filters may be created for different users of the system. For example, in an exemplary embodiment, a user may create a "Dodgers" filter and have the filter saved. This smart filter will eliminate the need of choosing from pre-defined filters such as "Sports" having subcategories including "baseball" which then may have a "Dodgers" subcategory. In some embodiments, such customized filters provide a method for a user to specifically choose the content/program they wish to view.

In one embodiment, providing one or more smart filters comprises an enhanced suggestion engine for providing suggestions/recommendations based on one or more criteria, including nature of the content, e.g. uniqueness of content such as a one time event that may have priority over a repeating event, a viewer identification associated with one or more of a genre, actor, time, channel, keyword, location and one or more predefined, user-defined and/or customizable keywords.

Referring again to FIG. 2, having provided a display of candidate programming choices, the process 20 then detects 23 when a viewer makes a preliminary selection of a particular one of the audio/visual program selections. Such a preliminary selection can be evinced in any of a variety of ways including through appropriate use of a remote control as mentioned above.

Referring again to FIG. 3, and in accordance with well understood practice, an area of focus 35 can serve, in a preferred embodiment, to indicate and to highlight such a preliminarily selected displayed program 34. Such focus capabilities are many and varied and are otherwise well understood in the art and include but are not limited to an overlying cursor icon, highlighting of the area of focus, use of reverse contrast, or application of a peripheral boundary indicator to visually indicate the area of focus, to name a few.

In many cases these characterizing descriptors can comprise a wide variety of media type and information. In general, it is usually not practical to display all available characterizing information for each candidate programming option (if nothing else, such a display can overwhelm the viewer with a sheer bulk of unprioritized data). Instead, if desired, a minimal subset of characterizing descriptors can be displayed for each of the programming options while a more complete (or at least expanded) set of characterizing descriptors can be displayed for the programming option that is the present subject of the area of focus 35. For example, this expanded display can comprise a display of supplemental information within the area of the original reduced display for the programming option and/or a display of supplemental information that lies outside the area of the original reduced display area. And again, such supplemental information can comprise any useful information including particularly textual information (such as a program description, total runtime, content genre, and so forth) and/or other content such as an animated or video presentation.

Referring again to FIG. 2, the process 20 then monitors for a plurality of possible viewer responses or actions. For example, the viewer may "select" 24 the preliminarily selected programming option. Such a selection can be indicated in any appropriate manner including, for example, by asserting a corresponding key on a remote control. The process 20 will then take a first predetermined action 25 with respect to whichever programming candidate has its corresponding characterizing descriptors in a predetermined relationship with respect to the area of focus (which predetermined relationship can comprise, for example, having the characterizing descriptor(s) occupy, at least in part, a same portion of the display as the area of visual focus).

The first predetermined action 25 can comprise, in a preferred embodiment, the addition of information regarding the corresponding selected audio/visual program to a list of preferred items. This list can comprise an updatable list that is restricted to only entries made in this fashion, or, if desired, can include other entries as well. As will be shown below in more detail, this list can be used by a viewer to retain information regarding programs that the viewer might be interested in viewing in the relatively near future. As such, it differs from more traditional so-called "favorites" lists that tend to be more long-lived and multi-purposed.

Figure 4:
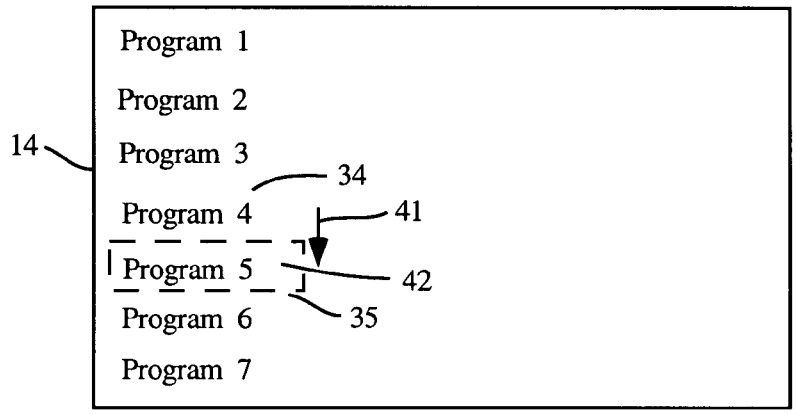
FIG. 4 comprises a display as configured in accordance with various embodiments of the invention.

As another example, the process 20 can monitor 26 to detect when the viewer effects preliminary selection of a different program offering. For example, and referring momentarily to FIG. 4, the viewer might cause the visual area of focus 35 to move downwardly 41 on the display 14 to thereby highlight the characterizing descriptor(s) 42 for a different program offering. (Such navigation practices are well known in the art and require no further elaboration here.) When this occurs, and referring again to FIG. 2, the process 20 can effect a second predetermined action 27 that is different from the first predetermined action noted earlier. At a minimum, this second predetermined action can comprise moving an area of visual focus away from the previously preliminarily selected audio/visual program. This action, in turn, will preferably result in preventing the viewer from subsequently adding the previously preliminarily selected program to the list of preferred items (unless, of course, the viewer returns to preliminarily select this program option again).

As another example, the process 20 can monitor 28 for some other viewer action and respond accordingly with a third predetermined action 29 that is different than either the first or the second predetermined action. This other viewer action and the corresponding action can be many and varied depending upon the needs of the given application. Pursuant to one approach, the viewer action can comprise an instruction to open and display the list of preferred items. The viewer might decide, for whatever reason, to view the list prior to concluding a review of all available programming options and such a command capability would facilitate such an action. Pursuant to another approach, the viewer action can comprise a display instruction as pertains to the then-highlighted programming option. In such a case, the corresponding action would be to facilitate appropriate processing and present display of that program. Many other options are of course also possible. Also, if desired, this process 20 can be expanded to include more than one of these options (and may in fact include every such option) such that multiple "other actions" are defined and supported accordingly.

If desired, and optionally, the process 20 can also monitor 30 a length of time that a viewer dwells on a particular preliminarily selected selection without actually effecting a specific addition of that selection to the list of preferred items. When the viewer exceeds some predetermined period of time (such as, for example, 15 seconds or 30 seconds), a conclusion can be made in many instances that the viewer found something of potential interest in the corresponding characterizing descriptors. In this event, the process 20 can automatically 31 add information regarding this particular programming selection to the updatable list of preferred items even in the absence of a specific indication to do so from the viewer. When so embodied, it is possible that such a list can be developed completely on the basis of reviewing time such that the creation of this list becomes totally transparent to the viewer.

So configured, and referring again to FIG. 4, a viewer can navigate amongst the displayed programming options in the programming guide by moving an area of focus 35 (or, in the alternative, by moving the characterizing descriptors in a scrolling manner with respect to the area of focus 35). In a preferred embodiment, the program information 42 that corresponds to the area of focus 35 at any given moment comprises a preliminarily selected item subject to the processes described herein. Accordingly, and with continued reference to this illustrative example, a viewer can select a presently highlighted preliminarily selected program 42 to thereby add information regarding that program to the list of preferred items. The viewer can then either now cause the display of the list or preliminarily select another program.

Figure 5:
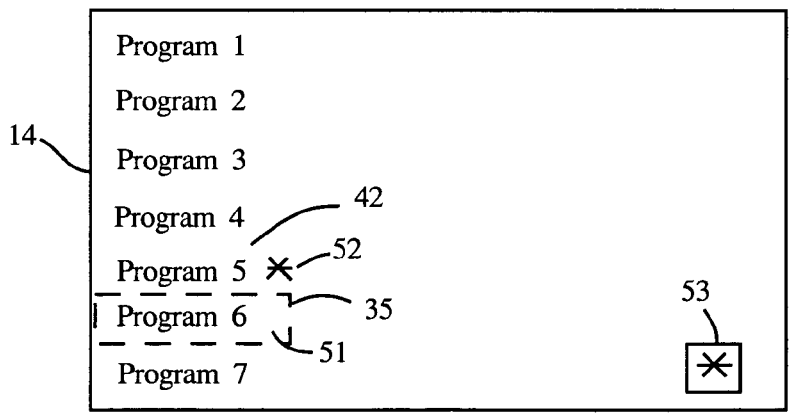
FIG. 5 comprises a display as configured in accordance with various embodiments of the invention.

For example, and referring now to FIG. 5, in this illustrative example, the area of visual focus 35 has been moved to another program descriptor 51 such that it is the latter that is now preliminarily selected.

FIG. 5 also illustrates that it may be desirable in some instances to mark programs that have been added to the list of preferred items with a corresponding indicator 52. Such an indicator 52 may be useful to some viewers with respect to subsequent navigation decisions and the like. The display 14 can also optionally include another indicator 53 to specify the existence of the list of preferred items and/or to provide an assertable link to cause the display of the list. In one embodiment this indicator 53 is not displayed until there is at least one item added to the list.

Figure 6:
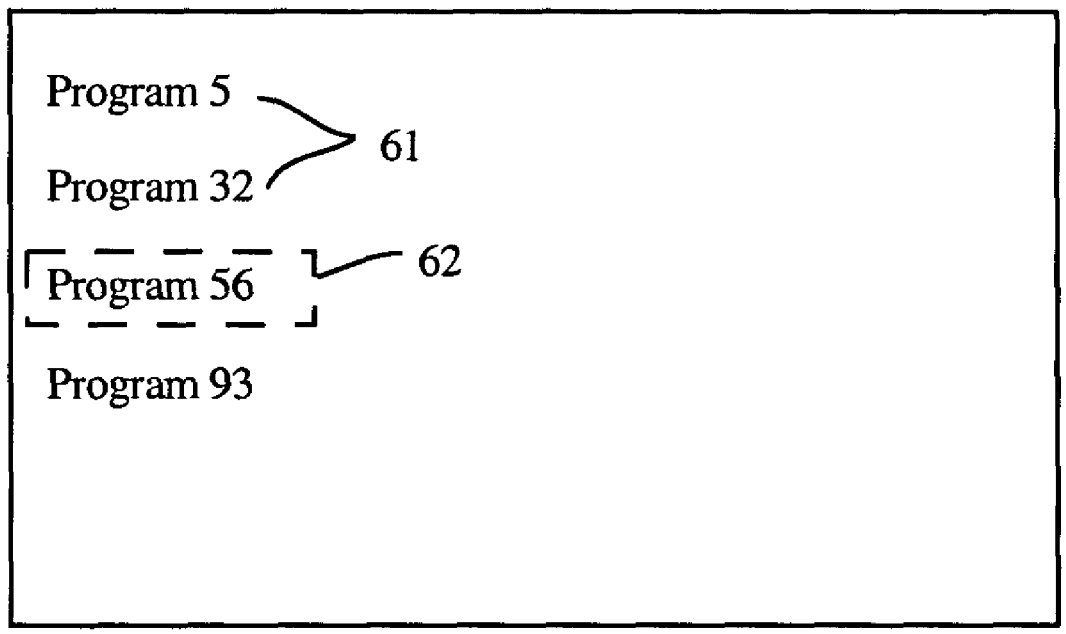
FIG. 6 comprises a display as configured in accordance with various embodiments of the invention.

As noted earlier, at some point the viewer will likely wish to view the list of preferred items. Referring now to FIG. 6, this list can comprise characterizing descriptors 61 for each program as has been added to the list in accord with the above-described processes. In a preferred embodiment, when displaying this list other un-selected candidate programs are not also displayed. This approach will tend to reduce confusion regarding which programs were actually preferred by the viewer. Also in a preferred approach, the viewer can navigate amongst the options to select-for-viewing, to bring forth additional characterizing descriptors, and/or to bring additional off-display options onto the display as desired.

It can therefore be seen that a viewer can navigate a large number of programming options in a highly intuitive fashion (making use of only a few basic and intuitive commands). A reduced short list of preferred items (i.e., those programs that were specifically marked as being of interest by a viewer and/or that otherwise attracted at least a minimal amount of the viewer's interest) is readily formulated during such navigation. This list is then readily brought forth to facilitate a final selection process. These benefits are realized without the need to access nested menus and these benefits remain essentially intact even though one scales the information set upwardly to include a relatively large body of data.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, if desired, the viewer can be allowed to create a second preferred list of items based upon items that are marked or otherwise selected from the list formed and described above. As another example, the list of preferred items can be specifically maintained for only a relatively short period of time. For example, the list can be cleared or expunged of data upon the attainment of a specific time of day, a specific period of time following an entry of an initial (or last) entry in the list, or the detection of a specific triggering event such as selection of a particular program for present viewing. Such automatic clearing comports well with the use of this list as a temporary tool to support a present browsing activity as versus a longer term filter mechanism. As yet another example, the formation of this list can include future (as versus only presently available) programming options. In this case, the process can provide automatic reminders to the viewer when such a program on the list approaches its presentation time.

We claim:

1. A method of using an interactive program guide by at least one user on a given audio/visual device, comprising the steps of: displaying an interactive program guide comprising at least one characterizing descriptor corresponding to a first one of a plurality of discrete selectable audio/visual programs and at least another characterizing descriptor corresponding to a second one of the plurality of discrete selectable audio/visual programs; detecting preliminary selection of the first one of the plurality of discrete selectable audio/visual programs and moving an area of visual focus to the first one of the discrete selectable audio/visual programs; detecting that the first one of the plurality of discrete selectable audio/visual programs is preliminarily selected for greater than a predetermined amount of time and adding information corresponding to the first one of the plurality of discrete selectable audio/visual programs to a list of preferred items of audio/visual content in response to the detection; detecting a user selection of the first one of the plurality of discrete selectable audio/visual programs and adding information corresponding to the first one of the discrete selectable audio/visual programs to the list of preferred items in response to the detection; detecting preliminary selection of the second one of the plurality of discrete selectable audio/visual programs and moving the area of visual focus away from the first one of the discrete selectable audio/visual programs; detecting an action with respect to the first one of the plurality of discrete selectable audio/visual programs, which action does not comprise either selecting the first one of the plurality of discrete selectable audio/visual programs or preliminarily selecting the second one of the plurality of discrete selectable audio/visual programs and displaying the list of preferred items in response to the detection; and automatically purging the list of preferred items in response to a predetermined trigger, wherein the trigger is selected from a group of triggers comprising selection of the first one the plurality of the discrete selectable audio/visual programs for viewing, selection of the second one of the plurality of the discrete selectable audio/visual programs for viewing, the expiration of a predetermined period of time after selection of the first one of the discrete selectable audio/visual programs for viewing, and the expiration of a predetermined period of time after selection of the second one of the discrete selectable audio/visual programs for viewing, whereby a temporary tool for supporting a present browsing activity is provided, and whereby the viewer is relieved of memorization and corresponding cognitive loading.

2. The method of claim 1, wherein the at least one characterizing descriptor and the at least another characterizing descriptor comprise at least one of: a programming network identifier; a broadcast starting time; a description of audio/visual content as corresponds to audio/visual program; and an audio/visual program media source.

3. The method of claim 1 wherein detecting preliminary selection of the first one of the plurality of discrete selectable audio/visual programs further comprises detecting at least a predetermined relationship between a present position of the at least one characterizing descriptor as corresponds to the first one of the plurality of discrete selectable audio/visual programs and the area of visual focus.

4. The method of claim 1 and further comprising determining when the user selects the first one of the plurality of discrete selectable audio/visual programs by detecting when the user asserts a selection action at a time when a characterizing descriptor as corresponds to the first one of the plurality of discrete selectable audio/visual programs occupies, at least in part, a same portion of a display as a predetermined area of visual focus.

5. A method of providing an interactive programming guide, comprising the steps of: providing an updatable list of preferred items of audio/visual content; displaying an interactive program guide comprising at least one characterizing descriptor corresponding to a first one of a plurality of discrete selectable items of audio/visual content and at least another characterizing descriptor corresponding to a second one of the plurality of discrete selectable items of audio/visual content; providing an area of visual focus on the at least one characterizing descriptor; in response to a first signal, adding information regarding the first one of the plurality of discrete selectable items of audio/visual content as corresponds to the at least one characterizing descriptor presently in the area of visual focus to the updatable list of preferred items of audio/visual content; in response to a second signal that is different from the first signal, moving the area of visual focus to the at least another characterizing descriptor; in response to a third signal that is different from both the first signal and the second signal, displaying the updatable list of preferred items of audio/visual content; adding information corresponding to the first one of the plurality of discrete selectable items of audio/visual content to the updatable list of preferred items of audio/visual content when the area of visual focus is on at least one characterizing descriptor as corresponds to the first one of the plurality of the plurality of discrete selectable items of audio/visual content for greater than a predetermined length of time; and purging the updatable list of preferred items of audio/visual content in response to a predetermined trigger, wherein the trigger is selected from a group of triggers comprising selection of the first one the plurality of the discrete selectable items of audio/visual content for viewing, selection of the second one of the plurality of the discrete selectable items of audio/visual content for viewing, the expiration of a predetermined period of time after selection of the first one of the plurality of discrete selectable items of audio/visual content for viewing, and the expiration of a predetermined period of time after selection of the second one of the plurality of discrete selectable items of audio/visual content for viewing, whereby a temporary tool for supporting a present browsing activity is provided, and whereby the viewer is relieved of memorization and corresponding cognitive loading; wherein the plurality of discrete selectable items of audio/visual content are embodied in a plurality of media.

6. The method of claim 5 wherein the response to the third signal further comprises not displaying at least one or more other characterizing descriptors as correspond to one or more other items of the plurality of discrete selectable items of audio/visual content that are not on the updatable list of preferred items of audio/visual content.

7. The method of claim 5 further comprising: receiving at least one of the first signal, the second signal, and the third signal from a remote control device.

8. A method of using an interactive program guide, comprising the steps of: displaying an interactive program guide comprising at least one characterizing descriptor corresponding to a first one of a plurality of discrete selectable audio/visual programs and at least another characterizing descriptor corresponding to a second one of the plurality of discrete selectable audio/visual programs; detecting preliminary selection of the first one of the plurality of discrete selectable audio/visual programs and moving an area of visual focus to the at least one characterizing descriptor corresponding to the first one of the discrete selectable audio/visual programs; detecting that the first one of the plurality of discrete selectable audio/visual programs is preliminarily selected for greater than a predetermined amount of time and adding information corresponding to the first one of the plurality of discrete selectable audio/visual programs to a list of preferred items of audio/visual content in response to the detection; detecting a user selection of the first one of the plurality of discrete selectable audio/visual programs and adding information corresponding to the preliminarily selected audio/visual program to the list of preferred items in response to the detection by detecting a user asserting a selection action at a time when the at least one characterizing descriptor corresponding to the first one of the discrete selectable audio/visual programs occupies, at least in part, a same portion of a display as the area of visual focus and adding information corresponding to the preliminarily selected audio/visual program to the list of preferred items in response to the detection; detecting preliminary selection of the second one of the plurality of discrete selectable audio/visual programs and moving the area of visual focus away from the first one of the discrete selectable audio/visual programs; detecting an action with respect to the first one of the plurality of discrete selectable audio/visual programs, which action does not comprise either selecting the first one of the plurality of discrete selectable audio/visual programs or preliminarily selecting the second one of the plurality of discrete selectable audio/visual programs and displaying the list of preferred items in response to the detection; and automatically purging the list of preferred items in response to a predetermined trigger, wherein the trigger is selected from a group of triggers comprising selection of the first one the plurality of the discrete selectable audio/visual programs for viewing, selection of the second one of the plurality of the discrete selectable audio/visual programs for viewing, the expiration of a predetermined period of time after selection of the first one of the discrete selectable audio/visual programs for viewing, and the expiration of a predetermined period of time after selection of the second one of the discrete selectable audio/visual programs for viewing, whereby a temporary tool for supporting a present browsing activity is provided, and whereby the viewer is relieved of memorization and corresponding cognitive loading; wherein the at least one characterizing descriptor and the at least another characterizing descriptor comprise at least one element selected from a group consisting essentially of a programming network identifier, a broadcast starting time, a description of audio/visual content as corresponds to the audio/visual program, and an audio/visual program media source, detecting preliminary selection of the first one of the plurality of discrete selectable audio/visual programs further comprises detecting at least a predetermined relationship between a present position of the at least one characterizing descriptor as corresponds to the first one of the plurality of discrete selectable audio/visual programs and the area of visual focus.

9. A method of providing an interactive programming guide, comprising: providing an updatable list of preferred items of audio/visual content; displaying an interactive program guide comprising at least one characterizing descriptor corresponding to a first one of a plurality of discrete selectable items of audio/visual content and at least another characterizing descriptor corresponding to a second one of the plurality of discrete selectable items of audio/visual content; providing an area of visual focus on the at least one characterizing descriptor; in response to a first signal, adding information regarding the first one of the plurality of discrete selectable items of audio/visual content as corresponds to the at least one characterizing descriptor presently in the area of visual focus to the updatable list of preferred items of audio/visual content; in response to a second signal that is different from the first signal, moving the area of visual focus to the at least another characterizing descriptor; in response to a third signal that is different from both the first signal and the second signal, displaying the updatable list of preferred items of audio/visual content; adding information corresponding to the first one of the plurality of discrete selectable items of audio/visual content to the updatable list of preferred items of audio/visual content when the area of visual focus is on at least one characterizing descriptor as corresponds to the first one of the plurality of the plurality of discrete selectable items of audio/visual content for greater than a predetermined length of time; and purging the updatable list of preferred items of audio/visual content in response to a predetermined trigger, wherein the trigger is selected from a group of triggers comprising selection of the first one the plurality of the discrete selectable items of audio/visual content for viewing, selection of the second one of the plurality of the discrete selectable items of audio/visual content for viewing, the expiration of a predetermined period of time after selection of the first one of the plurality of discrete selectable items of audio/visual content for viewing, and the expiration of a predetermined period of time after selection of the second one of the plurality of discrete selectable items of audio/visual content for viewing, whereby a temporary tool for supporting a present browsing activity is provided, and whereby the viewer is relieved of memorization and corresponding cognitive loading; wherein the response to the third signal further comprises not displaying at least one or more other characterizing descriptors as correspond to one or more other items of the plurality of discrete selectable items of audio/visual content that are not on the updatable list of preferred items of audio/visual content, wherein the plurality of discrete selectable items of audio/visual content are embodied in a plurality of media.

\* \* \* \* \*

UNITED STATES PATENT AND TRADEMARK OFFICE
CERTIFICATE OF CORRECTION

PATENT NO.        : 8,024,755 B2                         Page 1 of 1
APPLICATION NO.   : 10/806830
DATED             : September 20, 2011
INVENTOR(S)       : Nishikawa et al.

It is certified that error appears in the above-identified patent and that said Letters Patent is hereby corrected as shown below:

In the CLAIMS:
  Claim 1, column 9, line 10, delete "one the" and insert --one of the--.
  Claim 5, column 9, line 67, after "plurality" delete "of the plurality".
  Claim 5, column 10, lines 5-6, delete "one the" and insert --one of the--.
  Claim 8, column 11, line 3, delete "one the" and insert --one of the--.
  Claim 9, column 12, line 13, after "plurality" delete "of the plurality".
  Claim 9, column 12, line 18, delete "one the" and insert --one of the--.

Signed and Sealed this
Tenth Day of January, 2012

David J. Kappos
*Director of the United States Patent and Trademark Office*